US012705098B2

(12) United States Patent
Wang et al.

(10) Patent No.: US 12,705,098 B2
(45) Date of Patent: Aug. 11, 2026

(54) METHODS AND SYSTEMS FOR ENERGY-EFFICIENT SCHEDULING OF PERIODIC TASKS ON A GROUP OF PROCESSING DEVICES

(71) Applicant: Orange, Issy-les-Moulineaux (FR)

(72) Inventors: Lan Wang, Beijing (CN); Lei Yu, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 350 days.

(21) Appl. No.: 18/343,304

(22) Filed: Jun. 28, 2023

(65) Prior Publication Data

US 2024/0004707 A1 Jan. 4, 2024

(30) Foreign Application Priority Data

Jun. 29, 2022 (WO) ................ PCT/CN2022/102200

(51) Int. Cl.
*G06F 9/46* (2006.01)
*G06F 9/48* (2006.01)

(52) U.S. Cl.
CPC .................................. *G06F 9/4893* (2013.01)

(58) Field of Classification Search
CPC ..................................................... G06F 9/4893
See application file for complete search history.

(56) References Cited

PUBLICATIONS

International Search Report and Written Opinion dated Dec. 2, 2022 for Application No. PCT/CN2022/102200.

(Continued)

*Primary Examiner* — Gregory A Kessler
(74) *Attorney, Agent, or Firm* — Knobbe, Martens, Olson & Bear, LLP

(57) ABSTRACT

An energy-efficient assignment of a task set T to a group of M processing devices models the process of deciding the assignment as a combinatorial optimization problem having an objective function optimizing the power consumption of the devices when executing subsets of the tasks, under a constraint that the total utilization of the task subset assigned to each respective processing device is lower than a threshold depending on the number of its processor cores. The objective function may be:

$$\min\sum_{i=1}^{M} P_i(\tau_i),$$

where $\tau_i$ denotes the subset of tasks allocated to the ith device, and $P_i(\tau_i)$ represents power consumption of the ith device when executing $\tau_i$, and the constraint $U_{\tau_i} \leq M_i/4$ for all the devices, where $U_{\tau_i}$ is the total utilization of $\tau_i$ executing on the $i^{th}$ device, and $M_i$ denotes the number of cores of the $i^{th}$ device. Solving the problem using a MaxMin or genetic algorithm gives good energy efficiency.

17 Claims, 8 Drawing Sheets

(56) References Cited

PUBLICATIONS

He et al: "A Heuristic Energy-Aware Approach for Hard Real-Time Systems on Multi-core Platforms", Digital System Design (DSD) , 2012 15$^{TH}$ Euromicro Conference ON, IEEE, Sep. 5, 2012 (Sep. 5, 2012), pp. 288-295.

Bhuiyan et al: "Energy-Efficient Real-Time Scheduling of DAG Tasks", ACM Transactions on Embedded Computing Systems, ACM, New York, NY, US, vol. 17, No. 5, Sep. 17, 2018 (Sep. 17, 2018), pp. 1-25.

(a) Under Varying Task Period of 50 Tasks (b) Under Varying Task Period of 90 tasks

METHODS AND SYSTEMS FOR ENERGY-EFFICIENT SCHEDULING OF PERIODIC TASKS ON A GROUP OF PROCESSING DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to International Patent Application No. PCT/CN2022/102200, filed Jun. 29, 2022, the disclosure of which is hereby incorporated by reference in its entirety.

TECHNICAL FIELD

The disclosed technology relates to scheduling the execution of tasks by groups of processing nodes (such as a cluster of edge servers). More particularly, embodiments of the disclosed technology provide scheduling methods and scheduling apparatus that implement processing and offloading decisions over distributed infrastructure by considering the application requirements, device capacity and minimization (or, at least, reduction) of the total power consumption.

DESCRIPTION OF THE RELATED ART

There are many applications in which large volumes of data are generated at distributed locations and although, in principle, the data could be processed at a centralized location, for instance by cloud computing resources, data-transmission latency and/or other issues make it desirable for some or all of the data processing to be performed by edge server infrastructure. The edge server infrastructure may include a plurality of processing nodes and, when scheduling the execution of tasks, it may be appropriate to offload tasks from one edge server to another.

There have already been many publications which deal with the topic of edge server offloading policy, i.e., how to decide when to offload the execution of tasks from one edge server to another when the first edge server node has too much work to execute. Most of this work tries to model the offloading policy problem as an optimization problem, and then to use general methods/toolkits to solve this optimization problem based on a respective objective function. The different proposals make use of different objective functions.

Thus, for example, in a proposal "Energy-Efficient Dynamic Offloading and Resource Scheduling in Mobile Cloud Computing", by Songtao Guo et al. (2016 Infocom), the objective is to offload tasks running on a mobile device in mobile infrastructure to the cloud using an energy-efficient dynamic offloading and resource scheduling policy that consists of three sub-algorithms, namely: computation-offloading selection from mobile device to cloud, clock frequency control, and transmission power allocation for the mobile communication channel. This policy based on three sub-algorithms is relatively complicated to implement.

In another proposal, "A new task offloading algorithm in edge computing" by Zhang et al (EURASIP Journal on Wireless Communications and Networking (2021), 2021:17, see https://jwcn-eurasipjournals.springeropen.com/articles/10.1186/s13638-021-01895-6), the objective is to minimize the total latency of task execution and transmission time, and the targeted tasks are independent simple tasks which have no real-time timing constraints.

However, in many real-world scenarios, for instance in vehicle ad hoc networks (VANETs), there may be a large volume of sensor data that requires processing and, typically, this involves the execution of tasks by edge server infrastructure, including tasks that can be represented using a directed acyclic graph (DAG tasks) especially periodic DAG tasks.

Moreover, various prior proposals regarding offloading policy do not take into account the power consumption involved in execution of the task set.

The disclosed technology has been made in the light of the above issues.

SUMMARY

Embodiments of the disclosed technology provide a computer-implemented method of scheduling periodic tasks on a group of multi-core processors, the method comprising:

- defining as a combinatorial optimization problem the function of assigning, among a group of M processing devices, a set of tasks T for execution, the $i^{th}$ processing device having a number of processor cores equal to $M_i$,
- using an objective function optimizing the power consumption of said processing devices when executing subsets of said tasks T, with a constraint that, for each processing device, the total utilization of the task subset assigned to the respective processing device, when executing on said processing device, is lower than a threshold depending on the number of processor cores of said respective processing device;
- applying a heuristic algorithm to generate a solution to the defined combinatorial optimization problem; and
- on each of the processing devices, scheduling the task sub-set assigned to the respective processing device by the solution generated by the heuristic algorithm.

Embodiments of scheduling methods according to the disclosed technology enable periodic tasks to be scheduled in an energy-efficient manner across a group of processing devices. In many implementations, the group of processing devices is a cluster of edge servers with multi-core processor. Preferred embodiments of scheduling methods according to the disclosed technology may facilitate the scheduling of real-time periodic tasks, such as the real-time tasks that arise in newer applications, for instance smart transport and smart cities.

In certain embodiments of the above-mentioned scheduling methods according to the disclosed technology, each periodic task is a task that comprises sub-tasks and dependencies capable of representation by a directed acyclic graph, and:

for a group of M processing devices and a set of tasks T for execution, the $i^{th}$ processing device having a number of processor cores equal to $M_i$, the objective function of the combinatorial optimization problem is $$\min \sum_{i=1}^{M} P_i(\tau_i)$$

where $\tau_i$ denotes a subset of tasks, from task set T, which are allocated to the ith processing device, and $P_i(\tau_i)$ represents the power consumption of the ith processing device when executing the task sub-set $\tau_i$;

the constraint is that, in the solution, the relationship $U_{\tau_i} \leq M_i/4$ is respected for all the processing devices scheduled to execute tasks, where $U_{\tau_i}$ is the total utilization of the task sub-set $\tau_i$ when executing on the $i^{th}$ processing device;

and the heuristic algorithm is a heuristic MaxMin algorithm or a meta-heuristic Genetic Algorithm to generate a solution to the defined combinatorial optimization problem.

In embodiments of the disclosed technology that schedule periodic tasks that comprise sub-tasks and dependencies capable of representation by a directed acyclic graph (i.e., DAG tasks), the use of an optimization function $$\min \Sigma_{i=1}^{M} P_i(\tau_i)$$

and the enforcement of the constraint $U_{\tau_i} \leq M_i/4$ promotes low power consumption while respecting the need to ensure that all the tasks may be scheduled successfully over the group of processing devices. Use of the MaxMin algorithm or a meta-heuristic Genetic Algorithm to generate a solution to the defined combinatorial optimization problem has been found to promote solutions that have low power consumption.

In the above-mentioned scheduling methods according to the disclosed technology, a heuristic MaxMin algorithm may be applied to generate a solution to the defined combinatorial optimization problem, and the application of the heuristic MaxMin algorithm may comprise:

- setting to zero the sum of tasks' utilization on each processing device j of the group;
- determining a maximum value and minimum value of average power consumption for each task $T_i$ on each processing device j in the case where no power-saving measures are employed;
- for each task, determining the global maximum and global minimum of the average power consumption across the processing devices in the group;
- sorting the tasks of the group in descending order dependent on the difference between the global maximum and global minimum average power consumption for the respective task;
- sorting the processing devices of the group in ascending order of minimum value of average power consumption;
- for each processing device in the list, in ascending order, determining whether the sum of (i) the existing utilization of the respective processing device j, and (ii) the utilization of the remaining highest-ranked task $T_h$Th, in the list of tasks, is less than or equal to $M_j/4$; and
- if said sum is determined to be less than or equal to $M_j/4$, then assigning task $T_h$ to processing device j, and increasing the value for utilization of device j to said sum.

In the above-mentioned scheduling methods according to the disclosed technology, a meta-heuristic Genetic Algorithm may be applied to generate a solution to the defined combinatorial optimization problem, and the application of the genetic Algorithm may comprise:

- designing the chromosome used by the Genetic Algorithm as a vector, each vector location corresponding to a gene location in the Genetic Algorithm and each gene location corresponding to a task to be assigned to a processing device;

- setting the possible gene values to correspond to identifiers of the respective processing devices in the group; and
- running the Genetic Algorithm with a fitness function $$\min \sum_{i=1}^{M} P_i(\tau_i).$$

Simulations have shown that good energy-efficiency is obtained when the combinatorial optimization problem according to the disclosed technology is solved using a heuristic MaxMin algorithm or meta-heuristic Genetic Algorithm to determine how to assign periodic DAG tasks to processing devices within a group.

In the above-mentioned scheduling methods according to the disclosed technology, on each of the processing devices, the scheduling of the assigned task sub-set may be performed using a global earliest deadline first (GEDF) algorithm, or an SEDF scheduling technique described below. These techniques ensure that timing constraints of the tasks are respected and that energy-efficient scheduling is performed.

The computer-implemented scheduling methods according to the disclosed technology may include a preliminary step in which a first of the processing devices attempts to schedule the set of tasks for execution on its own processor cores. In the event that the scheduling attempt demonstrates that the workload is too great for the first processing device to execute while respecting timing constraints of the task set, then the above-mentioned combinatorial optimization problem is defined and solved to offload tasks to one or more other processing devices in the group.

In embodiments including the preliminary step, the first processing device may attempt to schedule the set of tasks for execution on its own processor cores according to a process (SEDF technique) comprising:

- decomposing a task into sub-tasks according to a directed-acyclic-graph representation of the task;
- generating a timing diagram assuming an infinite number of processor cores are available to process sub-tasks in parallel, said timing diagram representing execution of said sub-tasks on a schedule respecting the deadlines and dependencies of the sub-tasks defined by the directed-acyclic-graph;
- segmenting the timing diagram based on release times and deadlines of the sub-tasks, each segment including one or more parallel processing threads for execution, respectively, of at least part of a sub-task by a respective processor core;
- for each segment, dependent on the workload in the segment, deciding the frequency and/or voltage to be used by the processor core or cores to execute the one or more parallel processing threads of the segment, said decision setting the processor-core frequency and/or voltage to reduce power consumption to an extent that still enables respect of the sub-task deadlines; and
- scheduling execution of the sub-tasks of the segments assuming the processor-core frequencies and/or voltages set in the deciding step.

Particular good energy-efficiency is obtained in the case where the first device uses the SEDF technique to perform scheduling on its own cores but, in the event of overload, recourse is made to the task-distribution technique that uses the MaxMin or Genetic Algorithm to find a task-to-processing device assignment that minimizes overall power consumption.

In the above-mentioned preliminary step:

the generating of the timing diagram may assign to each segment a first number, m, of processor cores operating at a first speed, s; and the deciding of processor-core frequency and/or speed in respect of a segment may change the number of processor cores assigned to the segment to a second number m' and selects a second speed s' for the second number of processor cores, according to the following process:

determine whether the maximum utilization among the utilizations of the sub-tasks having portions in the segment is less than or equal to $s_B/s_{max}$, where $s_{max}$ is the maximal speed of the processor cores and $s_B$ is a speed bound defined as $$s_B = \left(\frac{P_s}{2C}\right)^{1/3}$$

where $P_s$ and C are constants in the power consumption function of the processor, in the case where the highest utilization $u_{max}$ is less than or equal to $s_B/s_{max}$, decide the second speed s' to be equal to $s_B$, and decide the second number m' of processor cores to be equal to $$\left\lfloor \frac{m \times s}{s_B} \right\rfloor,$$

and in the case where the highest utilization $u_{max}$ is greater than value $s_B/s_{max}$, decide the second speed s' to be equal to $u_{max} \times s_{max}$, and decide the second number m' of processor cores to be equal to $$\left\lfloor \frac{m \times s}{u_{max} \times s_{max}} \right\rfloor.$$

The afore-mentioned node-scaling approach for changing the number and speed of processing nodes handling the threads of the segments enables near optimal reduction in energy consumption.

Embodiments of the disclosed technology still further provide a scheduling system configured to schedule periodic tasks on a group of multi-core processors, said system comprising a computing apparatus programmed to execute instructions to perform any of the above-described scheduling methods. Such a scheduling system may be implemented on one or more edge servers.

Embodiments of the disclosed technology still further provide a computer program comprising instructions which, when the program is executed by a processor of a computing apparatus, cause said processor unit to perform any of the above-described scheduling methods.

Embodiments of the disclosed technology yet further provide a computer-readable medium comprising instructions which, when executed by a processor of a computing apparatus, cause the processor to perform to perform any of the above-described scheduling methods.

The techniques of the disclosed technology may be applied to schedule performance of tasks in many different applications including but not limited to control of vehicle ad hoc networks, tracking of moving objects or persons, and many more.

BRIEF DESCRIPTION OF THE DRAWINGS

Further features and advantages of the disclosed technology will become apparent from the following description of certain embodiments thereof, given by way of illustration only, not limitation, with reference to the accompanying drawings in which.

DETAILED DESCRIPTION

The disclosed technology provides embodiments of computer-implemented scheduling methods, and corresponding scheduling systems, that implement a new approach to decide how to offload tasks from one processing node to another. This approach is well-suited to the case where the tasks to be executed are DAG tasks, i.e., tasks that can be represented using a directed acyclic graph, and it seeks to minimize (or, at least reduce) power consumption.

Before describing the new approach in detail, some initial remarks are appropriate in regard to tasks, and DAG tasks in particular, as well as in regard to the scheduling of such tasks.

In some applications processing apparatus must perform real-time tasks in a repetitive manner, thus the tasks may be considered to be periodic and there is a known time period within which each instance of the task should be completed.

Figure 1:
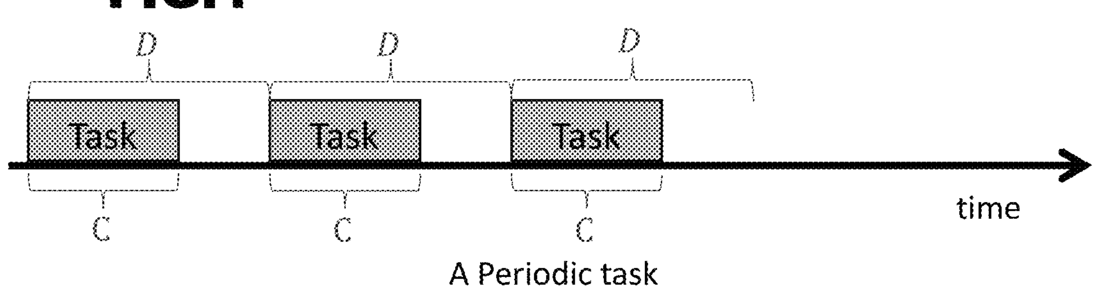
FIG. 1 is a diagram that schematically illustrates a periodic task for execution by processing apparatus.

FIG. 1 is a diagram illustrating a periodic task T. A time C is required to execute one instance of task T. Task T requires execution periodically and the duration of the period is designated D. In order for the available processing apparatus to be able to cope with performing this task T, the processing apparatus must be capable of executing the task in a time which is less than D. The "utilization", u, of the task T may be expressed by Equation (1):

$$u=C/D \quad \text{Equation (1)}$$

For a given set $\tau$ of tasks $\{T_1, T_2, \ldots, T_n\}$, $u_i$ represents the utilization of the task $T_i$, $u_{max}$ represents the utilization of the task within the set that has the highest utilization, and $U_\tau$ is the total utilization of the task set $\tau$, where $U_\tau$ is defined by Equation (2) below:

$$U_\tau = \sum_{i=1}^{n} u_i \quad \text{Equation (2)}$$

The operation of scheduling tasks on processing nodes may be considered to include two aspects: the assignment of tasks to processing nodes (e.g., processor cores), and the fixing of the timing or order of execution of the tasks by the assigned processing node.

In some cases, the processing apparatus available to execute a task may be a single-core processor. In such a case it is well-known to use the EDF (Earliest Deadline First) algorithm to schedule the execution of tasks by the processor core. According to the EDF algorithm, the priority given to tasks depends only on their respective deadlines. The task having the highest priority is executed first and the other tasks remain in a queue.

Multicore processors have become ubiquitous. In the case of using a multicore processor to execute a task, it is known to use the GEDF (Global-EDF) algorithm to schedule the performance of tasks by the various cores of the processor. All the tasks are in a global queue and have an assigned global priority. Tasks run in a core according to their priority. When a core becomes free it takes from the global queue the task having highest priority.

In a wide variety of applications, a directed acyclic graph (DAG) can be used to model a task that is to be performed by processing apparatus. The DAG comprises vertices and directed edges. Each vertex represents a sub-task (or job) involved in the performance of the overall task, and the directed edges show the dependency between the different sub-tasks, i.e., which sub-task must be completed before another sub-task can be performed. The DAG representation makes it easy to understand the dependency between the sub-tasks making up a task, and the opportunities for parallelism in processing the sub-tasks.

Each vertex in the graph can be an independent sub-task and, to execute such sub-tasks in real-world applications, each one may be deployed in a container such as the containers provided by Docker, Inc. As noted on the Docker Inc. website: "A container is a standard unit of software that packages up code and all its dependencies so the application runs quickly and reliably from one computing environment to another".

Figure 2:
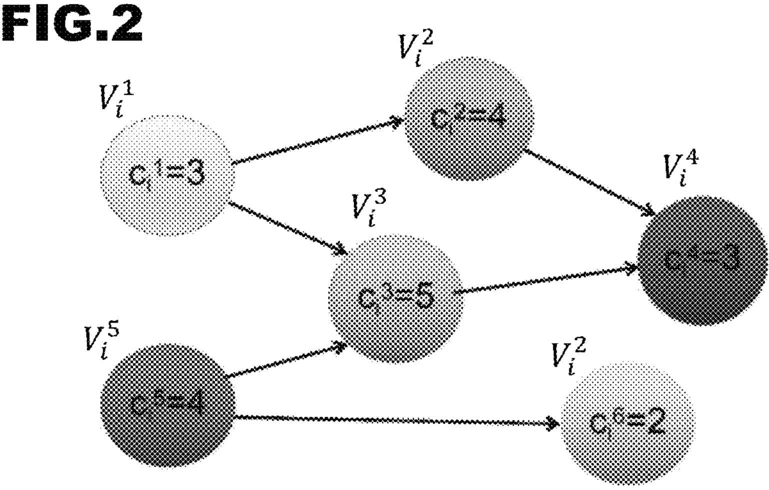
FIG. 2 is a diagram illustrating a directed acyclic graph (DAG) representing the sub-tasks involved in an example task that is to be executed by processing apparatus.

FIG. 2 is a drawing of an example of a DAG showing how a task $T_i$ may be decomposed into a set of sub-tasks $$V_i^1, V_i^2, V_i^3, V_i^4, V_i^5, \text{ and } V_i^6.$$

In FIG. 2, the parameters $c_i$ indicated for the respective vertices (sub-tasks) indicate their execution requirement, that is, the amount of processing required to execute this sub-task. Incidentally, it is common for the execution requirement to designate the number of CPU cycles required for execution of this sub-task, or to designate the required amount of time per se, and in applications involving the scheduling of real-time tasks time per se may be preferred.

Considering the dependencies of the sub-tasks, it can be understood from FIG. 2 that:

execution of sub-task $$V_i^2$$

cannot begin until execution of sub-task $$V_i^1$$

has been completed, execution of sub-task $V_i^3$ cannot begin until execution of both of sub-tasks $V_i^1$ and $V_i^5$ have completed,
execution of sub-task $V_i^4$ cannot begin until execution of both of sub-tasks $V_i^2$ and $V_i^3$ have completed, and
execution of sub-task $V_i^6$ cannot begin until execution of sub-task $V_i^4$ has been completed.
The DAG task has a critical path length which corresponds to the longest path through the graph in terms of execution requirement, considering the dependencies inherent in the graph. In the case of the DAG task represented in FIG. 2 the longest path through the graph is from $V_i^5$ to $V_i^3$ to $V_i^4$.

So, the critical path length is equal to 12. Considering the opportunities for parallel-processing, it can be understood from FIG. 2 that, in principle, sub-tasks tasks $V_i^2$, $V_i^3$, and $V_i^6$ could be executed in parallel.

A task that can be represented using a DAG may be referred to as a DAG task. A scheduling approach for DAG tasks has been described by Saifullah et al in "Parallel Real-Time Scheduling of DAGs" (IEEE Trans. Parallel Distributed Syst., vol. 25, no. 12, 2014, pp. 3242-3252), the entire contents of which are hereby incorporated by reference. In order to schedule a general DAG task, the Saifullah et al approach implements a task decomposition that transforms the vertices of the DAG into sequential jobs, each having its own deadline and offset. The jobs can then be scheduled either pre-emptively or non-preemptively. Saifullah et al showed that in the case of applying their DAG task decomposition algorithm and then scheduling the resulting jobs using pre-emptive GEDF, it could be guaranteed that scheduling would be possible, respecting timing constraints, for a set τ of real-time DAG tasks being executed by a multicore processor i having a number of cores $M_i$, provided that Equation (3) below is respected:

$$U_\tau \leq M_i/4 \quad \text{Equation (3)}$$

Unfortunately, the scheduling approach described in the preceding paragraph does not consider how to offload tasks from one processing node to another nor does it take into account the energy consumption involved in the processing and, in particular, does not schedule execution of the tasks in a manner that seeks to reduce energy consumption.

Figure 3:
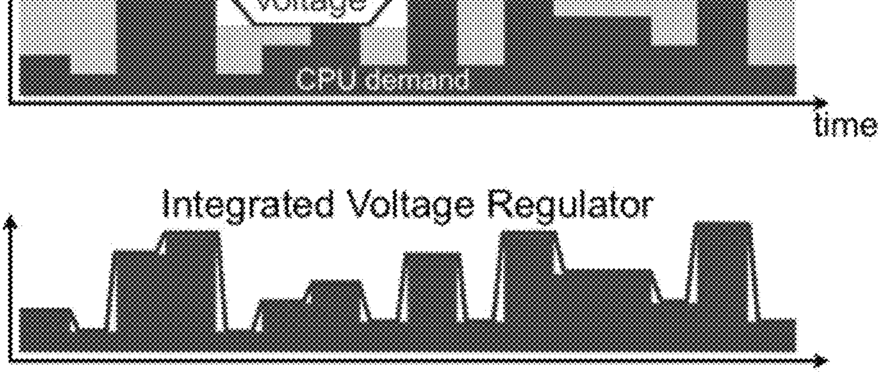
FIG. 3 illustrates how CPU voltage may be adjusted dependent on CPU workload, in order to reduce energy consumption, according to two different known approaches.

Various power-management techniques are known for reducing energy consumption when processing nodes (i.e., processors, cores) execute tasks. For instance, dynamic voltage and frequency scaling (DVFS) techniques adjust the frequency of a CPU according to the current workload, by controlling the CPU voltage. At times when the workload is heavy the CPU voltage and frequency are set high, whereas at times when the workload is light the CPU voltage and frequency can be reduced so as to reduce the power required to perform the processing. DPM (dynamic power management) techniques dynamically control power usage, and perhaps energy consumption, through controlling the CPU frequency by selecting among a number of available CPU operating modes, e.g., sleep (idle) and active (running). Power-management techniques such as these enable processing apparatus to perform required tasks using the minimum amount of power. FIG. 3 illustrates how, through use of power-management techniques, CPU voltage may vary with CPU workload in an example showing a pattern of variation in CPU workload (demand). The top diagram in FIG. 3 illustrates a case where the CPU voltage is varied by applying DPM techniques to change the CPU operating mode. The bottom diagram in FIG. 3 illustrates a case where the CPU voltage is varied by an integrated voltage regulator incorporated into the CPU (e.g., as in Intel® Core™ processors of 4th and subsequent generations).

Research is underway to develop so-called "power-aware" scheduling techniques, i.e., scheduling techniques that can schedule execution of tasks by processing apparatus in a manner that minimizes, or at least reduces, the energy consumption. In "Node Scaling Analysis for Power-Aware Real-Time Tasks Scheduling" (IEEE Transactions on Computers, Vol. 65, No. 8, August 2016, pp 2510-2521), the entire contents of which are hereby incorporated by reference, Yu et al have proposed an approach which seeks to reduce energy consumption by adjusting an initial schedule that has been generated by a scheduling algorithm. The adjustment increases the number of processing nodes (here, processor cores) which execute the processing but slows down the speed (processor clock frequency) so as to obtain an overall reduction in energy consumption. In the Yu et al proposal, in order to determine the appropriate adjustment in the number of cores and the core speed, the number of cores and core speed initially scheduled for processing the overall task set is considered (as well as certain inherent characteristics of the processing unit itself). In the Yu et al proposal, each real-time task in the set consists of a sequence of real-time jobs which must be performed one after the other.

The Yu et al proposal does not consider how to schedule DAG tasks, nor does it consider offloading policy per se.

The scheduling methods and systems according to embodiments of the disclosed technology can be employed for scheduling the execution of DAG tasks in a wide variety of applications. For example, these techniques can be applied in connection with mobile devices (phones and the like) for which conservation of battery power is an important issue, to schedule the execution of tasks (e.g., tasks involved in streaming) in an energy-efficient manner. Another application is to schedule execution of tasks in vehicle ad hoc networks, where sensor data processing often involves execution of DAG tasks on edge devices or modules. Indeed, there are many edge computing scenarios where application of the scheduling methods and systems provided by embodiments of the disclosed technology can provide advantages. Certain embodiments of the scheduling approach provided by embodiments of the disclosed technology will be described below in the context of one particular application scenario, namely the tracking of people imaged in video streams generated by a plurality of video cameras. This example scenario shall be discussed to facilitate understanding of the utility of the disclosed technology but it is to be understood that the scheduling methods and systems of embodiments of the disclosed technology are not limited to use in such a scenario but, rather, may be used in a wide variety of applications.

Figure 4:
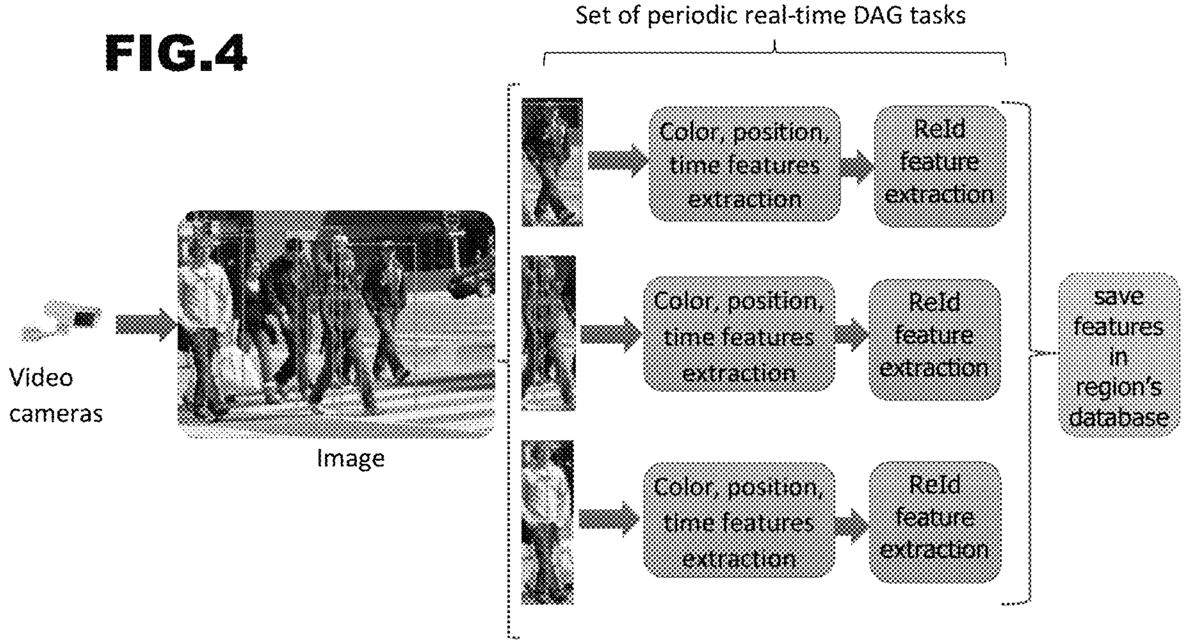
FIG. 4 is a diagram illustrating a tracking application which generates a task set that may be scheduled using scheduling methods and systems according to embodiments of the disclosed technology.

FIG. 4 illustrates a scenario in which multi-channel cameras generate video streams showing a scene in which there are moving objects (in this case, people). Suppose it is desired to track individuals and their movements, e.g., for collision-avoidance, for triggering of emergency-response (e.g., in so-called "smart security systems"), and so on. Such an application generates a set of periodic DAG tasks that require execution. A large volume of video data is generated and, in principle, it could be transmitted to a remote location so that a cloud computing platform could execute the target task set: for example, to extract features from the video, to identify individuals and to track their movements. However, in an application such as collision-avoidance or a smart security system, speedy processing is desirable. Traditional cloud computing has transmission latency and there may be data privacy problems involved in transmitting the data in question from the data-collection point to the location where the cloud-computing platform is situated. In the scenario illustrated in FIG. 4, a set of periodic DAG tasks is executed locally, e.g., on distributed edge infrastructure, and the results of this processing are transmitted off-site, e.g., to a cloud computing platform for further processing.

In the example illustrated in FIG. 4, each image captured by the video cameras is analysed locally so as to identify image regions showing respective different individuals, to extract features of colour, position and time characterizing the individual shown in the identified region, and to extract re-ID features that track a target person in views generated by multiple cameras. This recurrent set of processes constitutes a set of periodic real-time DAG tasks that are intended for execution on one or more edge devices/servers in the vicinity of the video cameras that generated the images. The features extracted from the images by execution of this task set can then be stored, for example in a database. It may not matter if there is a certain latency in the sending of the extracted feature data to the database and so, to save on infrastructure, a regional database may be used to store feature data relating to images captured by video cameras at a variety of locations.

Figure 5:
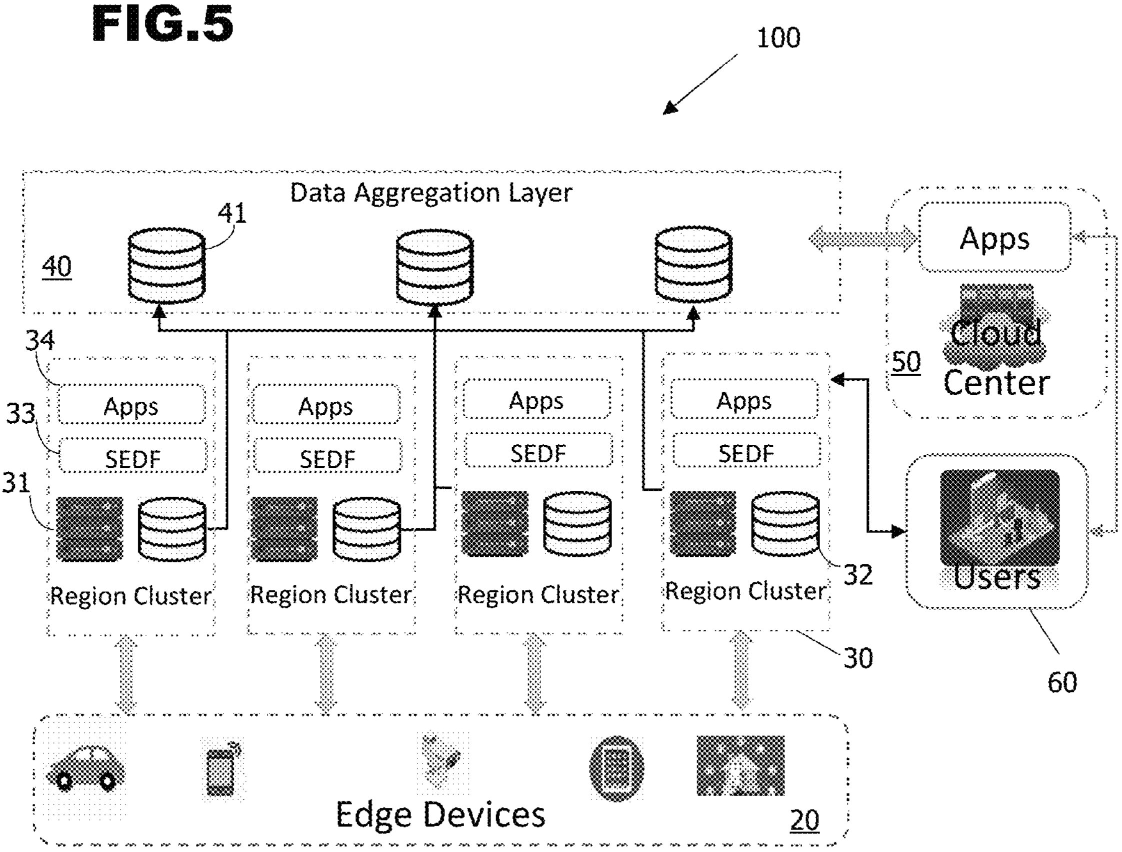
FIG. 5 is a diagram illustrating components of an example system for implementing the tracking application of FIG. 4, using edge infrastructure that employs power-aware scheduling methods according to embodiments of the disclosed technology.

FIG. 5 is a diagram illustrating components in an example system 100 suitable for implementing the tracking application of FIG. 4, using distributed edge devices that employ power-aware scheduling methods according to embodiments of the disclosed technology.

In the example illustrated in FIG. 5, the system 100 includes a number of edge devices 20 which may include video cameras, vehicles, mobile devices (phones, etc.), tablets, smart home devices, and so on. Typically, the edge devices 20 are distributed over a wide geographical area. In different regions, there are respective regional clusters 30 of resources including processing apparatus 31 (i.e., edge servers), storage devices 32 and so on which, in this implementation, include one or more servers 31 configured to execute tasks in accordance with scheduling performed according to embodiments of the disclosed technology. In the illustrated example, the system 100 is configured to implement a variety of applications, not just the tracking application illustrated in FIG. 4. Accordingly, the regional clusters include program code 34 enabling the implementation of the various different applications. The system 100 includes a data aggregation layer 40 to enable data from the different regions to be collected together, notably in one or more databases 41. A cloud computing center 50 exchanges data with the data aggregation layer in order to perform additional processing involved in execution of the applications, such as the tracking application of FIG. 4. Users 60 may interact with the cloud computing center 50 and/or the regional clusters 30 depending on the application.

Figure 6:
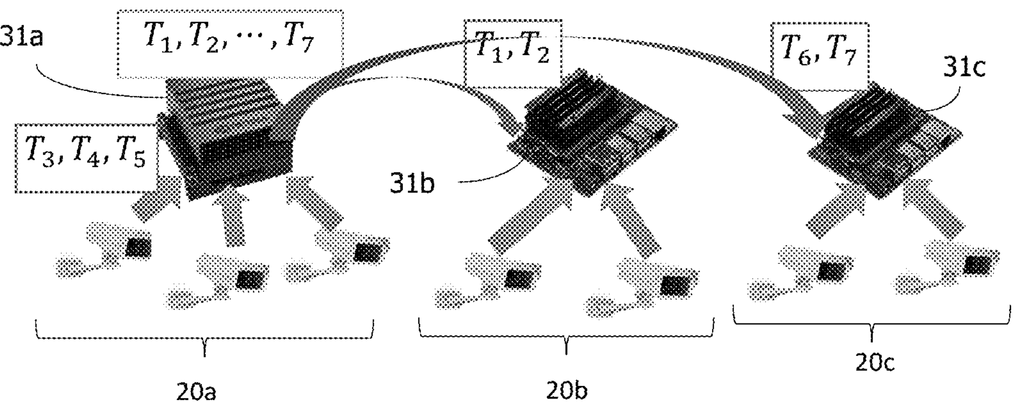
FIG. 6 is a diagram that illustrates schematically the issue of offloading tasks from one processing node to others.

FIG. 6 is a diagram to illustrate an offloading issue considered by embodiments of the disclosed technology. FIG. 6 relates to an example in which a first edge server 31*a* receives image data from a group of video cameras 20*a*, a second edge server 31*b* receives image data from another group of video cameras 20*b*, and a third edge server 31*c* receives image data from yet another group of video cameras 20*c*. In this example the edge servers 31*a*, 31*b* and 31*c* are arranged in the same local cluster 30 so the latency involved in offloading tasks from one of the servers to another is small. The example illustrated in FIG. 6 relates to a situation in which the video data sent from video cameras 20*a* to edge server 31*a* generates a set of seven tasks $\{T_1, T_2, T_3, T_4, T_5, T_6, T_7\}$ that require processing in a specified time frame, for instance in real time. It may be the case that, in view of the capabilities of edge server 31*a* and the timing constraints involved in the tasks, edge server 31*a* is incapable of executing all of the tasks in the required time frame. Accordingly, it may be appropriate to offload, say, tasks $T_1$ and $T_2$ to edge server 31*b*, and to offload tasks $T_6$ and $T_7$ to edge server 31*c* in order to ensure that all of these tasks are executed in time.

Embodiments of the disclosed technology provide scheduling methods and scheduling systems that make offloading decisions in view of achieving optimal overall power consumption. So, in embodiments of the disclosed technology, the offloading decision is formulated as a combinatorial optimization problem having an objective function which is as defined in Equation (4) below considering the case where a set of tasks T is being distributed among a group of M processing devices, with the ith processing device having a number of processor cores equal to $M_i$.

Equation (4)

$$\min\sum_{i=1}^{M} P_i(\tau_i)$$

where $\tau_i$ denotes a subset of tasks, from task set T, which are allocated to the ith processing device, and $P_i(\tau_i)$ represents the power consumption of the ith processing device when executing the task sub-set $\tau_i$.

In other words, in embodiments of the disclosed technology the objective function of the combinatorial optimization problem seeks to minimize total power consumption by the overall set of processing devices in executing the overall set of tasks.

The above-mentioned combinatorial optimization problem includes a number of constraints. Certain preferred embodiments of the disclosed technology incorporate scheduling using a preemptive GEDF algorithm and are applied to DAG tasks. So, in certain preferred embodiments of the disclosed technology, the combinatorial optimization problem includes Constraint (1) below, based on Equation (3) above, applicable to each of the processing devices, to guarantee that all tasks in the targeted task set T can be scheduled successfully (i.e., so that they can be executed respecting their timing constraints) on multicore devices using a pre-emptive GEDF algorithm in the case where the tasks are DAG tasks.

Constraint (1)

For each of the M devices between which the task set is being distributed, the relationship $$U_{\tau_i} \leq M_i / 4$$

must be respected.

Another applicable constraint is the requirement, for a periodic task, that its execution requirement C be less than or equal to its period D (see FIG. 2).

In principle, known algorithms may be used to solve the above-described combinatorial optimization problem defined in the disclosed technology. However, certain preferred embodiments of the disclosed technology make use either of:

- a heuristic MaxMin task-allocation algorithm (first embodiment of the disclosed technology), or
- a meta-heuristic genetic algorithm (second embodiment of the disclosed technology) to solve the above-described combinatorial optimization problem.

A description will be given below of example embodiments of methods for implementing each of these algorithms.

The application of a heuristic MaxMin algorithm or a meta-heuristic Genetic Algorithm to generate a solution to the defined combinatorial optimization problem identifies an assignment of task sub-sets to respective processing devices. In certain preferred embodiments of the disclosed technology, the scheduling of the task sub-sets on each respective processing device is then performed using a global EDF algorithm, or using an SEDF technique which involves adjustment of CPU speed to achieve yet further power savings. The SEDF technique is described below in relation to the third embodiment of the disclosed technology.

Example of the First Embodiment, Using a Heuristic MaxMin Algorithm

The MaxMin algorithm has been employed in the state-of-the-art for the energy-aware scheduling of tasks on cores in a multi-core system in a context where the processing platforms are heterogeneous: see M. A. Awan, P. M. Yomsi, G. Nelissen, and S. M. Petters, "Energyaware task mapping onto heterogeneous platforms using DVFS and sleep states," Real Time Syst., vol. 52, no. 4, pp. 450-485, 2016 (available online at: https://doi.org/10.1007/s11241-015-9236-x [2]) and S. Moulik, R. Chaudhary, and Z. Das, "HEARS: A heterogeneous energy-aware real-time scheduler," Microprocess. Microsystems, vol. 72, 2020. (available online at: https://doi.org/10.1016/j.micpro.2019.102939). According to those proposals, it is desired to calculate the average power consumption (defined as: $ED_{j,i}$) of task $T_i$ in a task set T on each core j, and to find the maximum value ($ED_{max,i}$) and minimum value ($ED_{min,i}$) among all the values of $ED_{j,i}$. Then, the tasks in task set T are sorted in descending order with respect to the value of $ED_{max,i}-ED_{min,i}$ and are collected in a global list. Allocation of tasks to cores begins at the top of the global list. A task from the top of the global list is considered for allocation from its favorite to a least preferred core, and it is removed from the list when it is mapped on a core. A different task is now at the top of the global list and the process is repeated.

In an example of the first embodiment of the disclosed technology, a heuristic MaxMin algorithm is applied to solve the above-described combinatorial optimization problem defined in the disclosed technology, i.e., to find the minimize the objective function specified in Equation (4), while respecting Constraint (1).

In a case where we define $ED_{max,i}$ as the maximum value of average power consumption of task $T_i$ on each device j assuming that no power-saving measures (such as DVFS) are applied, and $ED_{min,i}$ as the minimum value (lower bound) of power consumption of task $T_i$ on each device j, then a MaxMin approach can be used as a heuristic to find an approximate solution, for instance according to the logical flow listed below.

Input: Task set $\tau$ and the devices cluster $\pi$ with M devices
Output: Tasks assignment
1: $U^j \leftarrow 0$ /*set the sum of tasks' utilization on each device j to 0* /
2: calculate $ED_{i,max}{}^j$ and $ED_{i,min}{}^j$ for each $T_i$ on each device j
3: find $ED_i^{max} \leftarrow \max_{x=1,\ldots,M} ED_{i,max}^x$
4: find $ED_i^{min} \leftarrow \min_{x=1,\ldots,M} ED_{i,min}^x$
5: sort $\tau$ with respect to $ED_i^{max} - ED_i^{min}$ in descending order
6: for each task $T_i \in \tau$ do
7:    sort devices with respect to $ED_{i,min}{}^x$ in ascending order
8:    for each device $j \in \pi$ do
9:       if $U^j + U_i \leq M_j/4$ then
10:          assign $T_i$ to j and $U^j \leftarrow U^j + U_i$
11:          break
12:       end if
13:    end for
14: end for Example of the Second Embodiment, Using a Meta-Heuristic Genetic Algorithm In an example of the second embodiment of the disclosed technology, a meta-heuristic genetic algorithm is applied to solve the above-described combinatorial optimization problem, i.e., to minimize the objective function specified in Equation (4), while respecting Constraint (1).

To implement this second approach, as is usual for genetic algorithms, a population of candidate individuals is generated, each candidate individual being characterized by its chromosome. The fitness of each individual in the population is evaluated using the fitness function. A number of individuals having the highest fitness are selected and then, to create a "next generation", mutation and/or crossover operations are implemented on the chromosomes of the selected individuals. Then the set of processes is repeated. Eventually, when a termination criterion is met, an individual whose chromosome has the highest fitness value is selected as the solution to the targeted problem.

In a genetic algorithm, the chromosomes represent the possible solutions, and genes are denoted by the space of possible values for each item in the chromosome. The result of the fitness function is the fitness value representing the quality of the solution. So, it is necessary to design an appropriate chromosome, the set of genes, and the fitness function.

In an example of the second embodiment of the disclosed technology, the chromosome is defined as a vector with dimensions equal to the number of tasks that need to be assigned to processing devices, and each element in the vector (i.e., each gene location) corresponds to a task in the task set. The gene locations along the chromosome represent the tasks. The value indicated for each gene location denotes the identity (i.e., an identification number or code) of the device to which the task is allocated, and the value range of elements represents the gene space. The fitness function corresponds to the objective function specified in Equation (4) above with an associated tester. The tester in the fitness function checks whether or not Constraint (1) is fulfilled by the solution in question. If Constraint (1) is not fulfilled, then the value of the fitness function is set to be very small, as a penalty.

Figure 7:
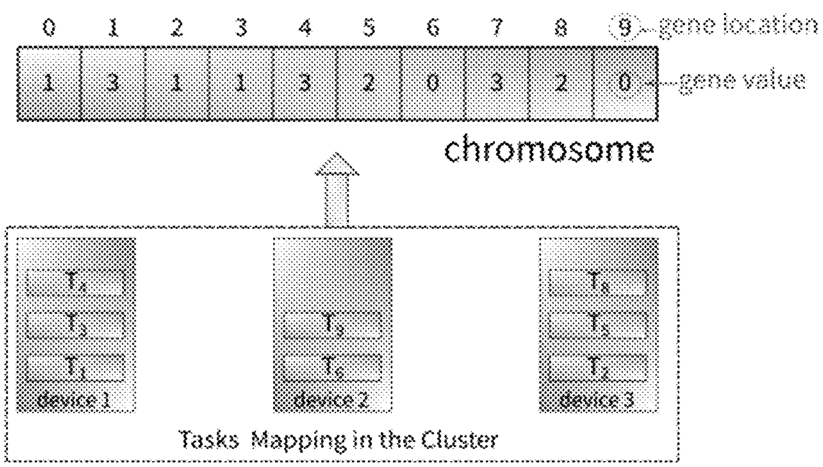
FIG. 7 is a diagram that illustrates an example of a chromosome and genes of a genetic algorithm that may be employed in a second embodiment of the disclosed technology and how these relate to tasks allocated to different processing devices in a cluster.

An example of the design of a chromosome and genes that may be used in the proposed genetic algorithm is illustrated in FIG. 7. In the example illustrated in FIG. 7, there are 10 tasks, $\{T_1, T_2, \ldots, T_{10}\}$, and a cluster of three processing devices available to execute the tasks. In the FIG. 7 example, the gene space is $\{0, 1, 2, 3\}$ where $\{1\}$, $\{2\}$ and $\{3\}$ represent the information that a task is allocated on device 1, 2 and 3, respectively, and $\{0\}$ means the task is not assigned on any devices. The gene value listed at a gene location k indicates which device is assigned to execute the task $T_{k+1}$. The chromosome represented in FIG. 7 corresponds to an individual solution in which the tasks $T_7$ and $T_{10}$ are not assigned to any of the devices in the cluster because of the limit of resource capabilities, the tasks $T_1$, $T_3$ and $T_4$ are assigned to device 1, the tasks $T_6$ and $T_9$ are assigned to device 2, and the tasks $T_2$, $T_5$ and $T_8$ are assigned to device 1.

Results of Simulations

Simulations were performed to compare, on the one hand, the power consumption involved in executing periodic real-time DAG tasks according to task-allocations determined using various known scheduling algorithms with, on the other hand, the power consumption achieved when scheduling the same tasks on the same cluster of devices using embodiments of scheduling method according to the first and second embodiments of the disclosed technology. The simulations included calculations performed in respect of allocating tasks among a cluster of devices which were homogenous, that is, each device had the same number of cores, 12 cores in these simulations. The simulations also included calculations performed in respect of allocating tasks among a cluster of devices which were heterogeneous, that is, the considered devices had different numbers of cores, namely 16 cores, 12 cores or 8 cores in the simulations. Moreover, the simulations considered how to allocate task sets that contained periodic real-time DAG tasks having different periods, including: harmonic task periods where the period=$2^{\varepsilon}$, and including arbitrary periods in which the period was derived from a gamma distribution.

Figure 8:
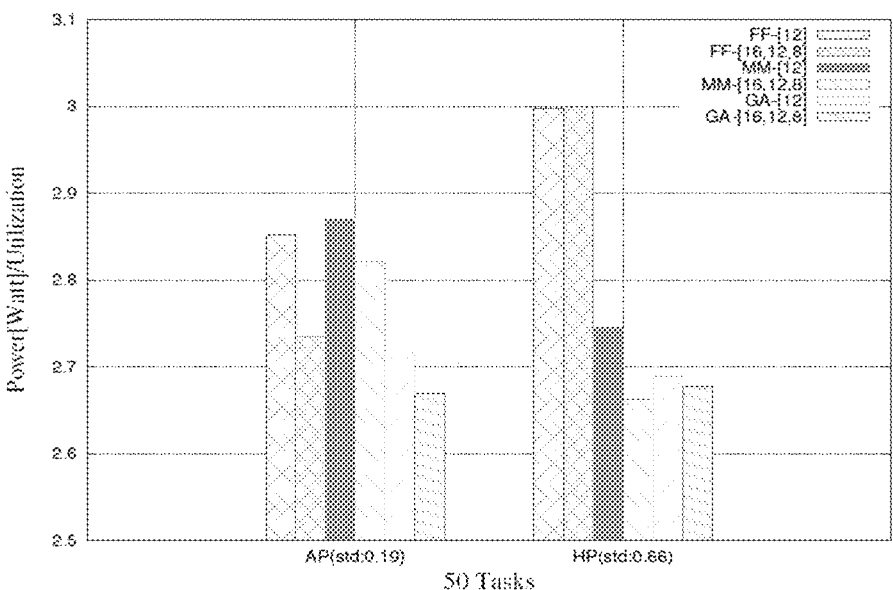
FIG. 8 is a first graph comparing, on the one hand, the power consumption involved in executing sets of periodic DAG tasks that are distributed to processing devices within a cluster according to various known scheduling algorithms with, on the other hand, the power consumption achieved when the task-distribution is implemented using examples according to the first and second embodiments of the disclosed technology—in the case where the task sets include 50 tasks.

FIG. 8 illustrates the results of a first set of simulations which considered how to allocate a set of 50 tasks, including some sets of tasks having harmonic periods and some sets of tasks having arbitrary periods. In the task sets where the tasks had arbitrary periods the standard deviation of the period was relatively small, namely 0.19. In the task sets where the tasks had harmonic periods the standard deviation of the period was relatively large, namely 0.66.

Figure 9:
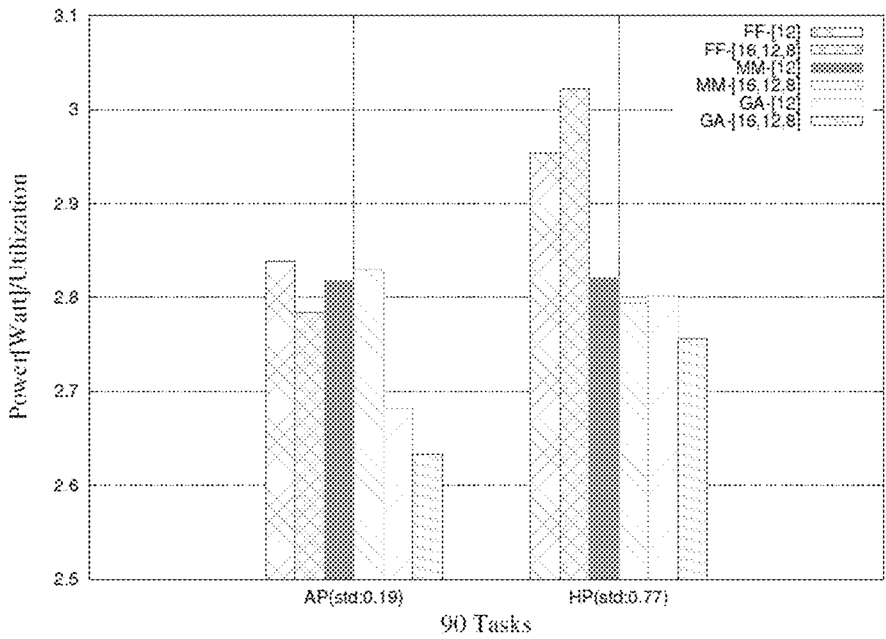
FIG. 9 is a second graph comparing, on the one hand, the power consumption involved in executing sets of periodic DAG tasks that are distributed to processing devices within a cluster according to various known scheduling algorithms with, on the other hand, the power consumption achieved when the task-distribution is implemented using examples according to the first and second embodiments of the disclosed technology—in the case where the task sets include 90 tasks.

FIG. 9 illustrates the results of a second set of simulations which considered how to allocate a set of 90 tasks, including some sets of tasks having harmonic periods and some sets of tasks having arbitrary periods. In the task sets where the tasks had arbitrary periods the standard deviation of the period was relatively small, namely 0.19. In the task sets where the tasks had harmonic periods the standard deviation of the period was relatively large, namely 0.77.

The task-allocation algorithms compared in the graphs of FIG. 8 and FIG. 9 are, as follows:

- FF-[12]: this represents application of a baseline FirstFit algorithm to distribute the simulated task set among three homogenous devices each having 12 processor cores. The baseline FirstFit approach is described in "A survey of hard real-time scheduling for multiprocessor systems," by R. I. Davis and A. Burns (in ACM Comput. Surv., vol. 43, no. 4, pp. 35:1-35:44, 2011, available online at: https://doi.org/10.1145/1978802.1978814).
- FF-[16,12,8]: this represents application of a baseline FirstFit algorithm to distribute the simulated task set among heterogeneous devices: three devices having 16 cores, three devices having 12 cores and three devices having 8 cores.
- MM-[12]: this represents the performance of an example of the first embodiment of the disclosed technology that employed a heuristic MaxMin algorithm as described above, to distribute the simulated task set among three homogenous devices each having 12 processor cores.
- MM-[16,12,8]: this represents the performance of an example of the first embodiment of the disclosed technology that employed a heuristic MaxMin algorithm as described above, to distribute the simulated task set among heterogeneous devices: three devices having 16 cores, three devices having 12 cores and three devices having 8 cores.
- GA-[12]: this represents the performance of an example of the second embodiment of the disclosed technology that employed a genetic algorithm as described above, to distribute the simulated task set among three homogenous devices each having 12 processor cores.
- GA-[16,12,8]: this represents the performance of an example of the second embodiment of the disclosed technology that employed a genetic algorithm as described above, to distribute the simulated task set among heterogeneous devices: three devices having 16 cores, three devices having 12 cores and three devices having 8 cores.

As can be seen from FIG. 8 and FIG. 9, the scheduling methods according to the first and second embodiments of the disclosed technology result in a lower power consumption than the comparative example in nearly all cases. The power consumption is best in the simulations according to the second embodiment of the disclosed technology that employed the genetic algorithm. However, in view of the fact that it is time-consuming to implement a genetic algorithm, it may be advantageous to employ the second embodiment of the disclosed technology that implements a MaxMin algorithm, particularly in situations where the is increased heterogeneity in the task set and/or in the processing devices.

Thus, it can be seen that the scheduling methods proposed by embodiments of the disclosed technology enable periodic real-time DAG tasks to be distributed between processing devices in a manner which is energy-efficient.

As noted above, there are various scenarios in which DAG tasks are to be executed on a cluster of devices, for example, a cluster of edge servers. In some such scenarios it may be desired, as a preliminary step, to schedule tasks on a first processing device of the cluster and, if this particular processing device is overcharged, then to employ a scheduling method according to the first embodiment or second embodiment of the disclosed technology to determine how to offload tasks to other processing devices in the cluster in an energy-efficient manner. A third embodiment of the disclosed technology will now be described in which such an approach is taken and, in addition, a new technique (here called SEDF) is used to schedule the execution of tasks in the first processing device in a manner which maximizes energy saving on this first device when processing DAG tasks.

In the third embodiment of the disclosed technology, a computer-implemented scheduling method 400 which schedules tasks to be performed on a given processing device is designed to implement the SEDF technique. Implementation of the SEDF technique will now be described with reference to FIGS. 10 to 13.

Figure 10:
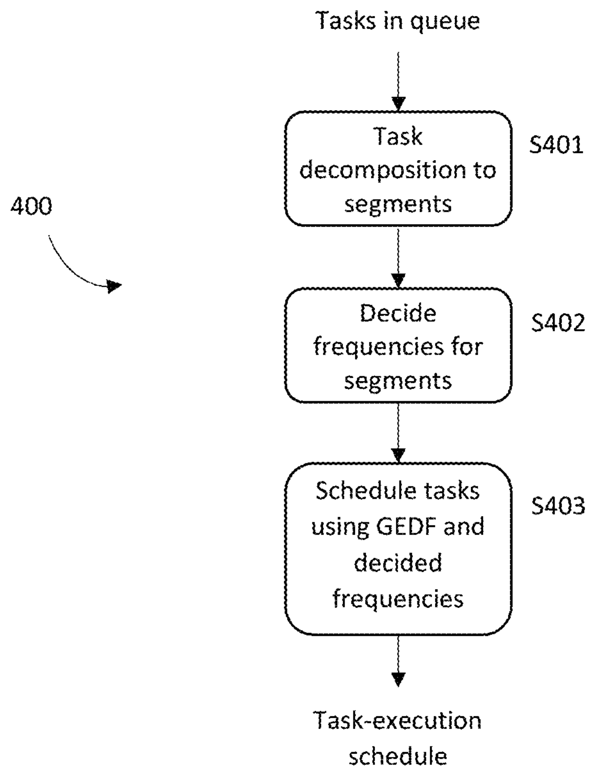
FIG. 10 is a flow diagram illustrating an example of a computer-implemented scheduling method employed in a preliminary step that may be implemented in a third embodiment of the disclosed technology.

The main steps in the scheduling method 400 according to the SEDF technique are illustrated in the flow diagram of FIG. 10. It is assumed that there are a certain number of tasks that need to be executed by a processing device, which is a multicore device, and that these tasks are queued.

In a step S401, the tasks in the queue are decomposed into segments. The preferred process for decomposing a task into segments will be discussed with reference to FIG. 11. To facilitate understanding of the disclosed technology the discussion below considers an example in which a task to be executed by a processing system is a task $T_i$ that can be represented by the DAG of FIG. 2. However, the skilled person will readily understand how to apply the teaching below for scheduling other tasks that would be presented using different DAGs, and for scheduling a set $\tau$ of tasks $\{T_1, T_2, \ldots, T_n\}$.

In the scheduling technique described by Saifullah et al op. cit., in order to determine deadlines and release times for different sub-tasks, there is an intermediate step in which tasks are decomposed into segments and the decomposition can be represented using a type of synthetic timing diagram. First of all, the DAG task is represented using a timing diagram $$T_i^{\infty}$$

generated based on the assumption that the available number of processing nodes is infinite, whereby a maximum use of parallel processing is possible. This timing diagram $$T_i^{\infty}$$

is then divided up into segments by placing a vertical line in the timing diagram at each location where a sub-task starts or ends, and the segmented timing diagram may be considered to be a synthetic timing diagram $$T_i^{syn}.$$

In a similar way, in preferred embodiments of the SEDF technique the DAG task is represented using a timing diagram $$T_i^{\infty}$$

generated based on the assumption that the available number of processing nodes is infinite, and then this timing diagram $$T_i^{\infty}$$

is divided up into segments by placing a vertical line at each location where a sub-task starts and at the sub-task's deadline, yielding a new synthetic timing diagram $$T_i^{syn'}.$$

Figure 11:
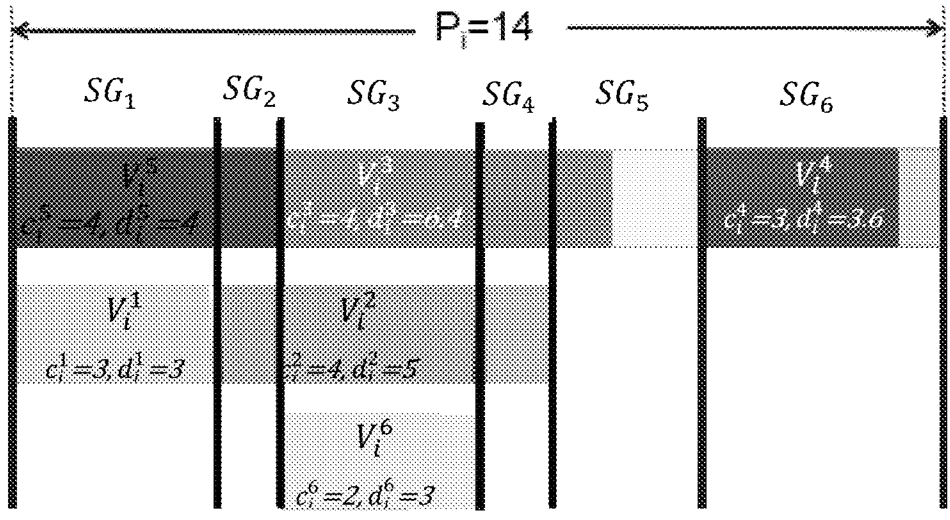
FIG. 11 is a timing diagram showing how the example task represented by the DAG of FIG. 2 can be decomposed in a technique employed in a third embodiment of the disclosed technology, and how the decomposition can define segments in the processing.

FIG. 11 represents a synthetic timing diagram $$T_i^{syn'}$$

of this type generated for the example task represented in FIG. 2. In FIG. 11, each sub-task V is labelled and its execution requirement c and its deadline d are indicated.

It may be considered that the period between a pair of vertical lines in FIG. 11 constitutes a segment SG of the synthetic timing diagram $$T_i^{syn}$$

of FIG. 11, and that there is a sequence of six segments:

$$\{SG_i^1, SG_i^2, SG_i^3, SG_i^4, SG_i^5, SG_i^6\}.$$

In FIG. 11, $P_i$ represents the period of the task $T_i$. Parts of different sub-tasks that are in the same segment SG may be thought of as threads of execution running in parallel.

In the Saifullah et al approach, after their segment parameters have been determined, the individual deadlines and release times of each sub-task are determined from the deadlines and release times of the segments in which they are located, and the notion of segments ceases to be relevant. However, in certain preferred embodiments of the disclosed technology power-saving measures are implemented on the basis of the segments defined in $$T_i^{syn'}.$$

More specifically, in step S402 of the method 400, for each segment $SG_j$, an operating frequency $f_j$ is selected for all the processing nodes involved in processing tasks during that segment $SG_j$. Various power-saving algorithms can be applied to determine an appropriate frequency setting, for example known DVFS techniques. However, in preferred embodiments of the SEDF technique the number of processing nodes involved in parallel-processing the sub-tasks of a given segment is extended from the initial number m defined in the synthetic timing diagram $$T_i^{syn'}$$

to an extended number m', and the speeds of the processing nodes are reduced from the initial speed s defined in the synthetic timing diagram $$T_i^{syn'}$$

to a reduced speed s', according to the node-scaling approach described by Yu et al op. cit. This enables a reduction to be achieved in the energy consumption involved in executing the processing allocated to this segment. The operating frequency $f_j$ selected in respect of a segment $SG_j$ corresponds to the reduced speed s' determined for the extended number m', of processing nodes executing sub-tasks in segment $SG_j$.

The node-scaling approach involves the following steps: let $s_{max}$ be the maximal speed of the processor cores

- a determination is made, in respect of the sub-task threads being parallel-processed in this segment $SG_j$, as to whether the highest utilization $u_{max}$ among the utilizations of the overall sub-tasks having portions in the segment is less than or equal to a value $s_B/s_{max}$, where $s_B$ is a speed bound and is defined as $$s_B = \left(\frac{P_s}{2C}\right)^{1/3}.$$

$P_s$ and c are constants in the power consumption function of the processor (and can be determined by running applications in the processor, as explained in Yu et al op. cit.).
- in the case where the highest utilization $u_{max}$ is less than or equal to value $s_B/s_{max}$, the adjusted core speed s' is set to $s_B$, and the number of processing nodes is extended to $$m' = \left\lfloor \frac{m \times s}{s_B} \right\rfloor.$$

- in the case where the highest utilization $u_{max}$ is greater than value $s_B/s_{max}$, the adjusted core speed s' is set to $u_{max} \times s_{max}$, and the number of processing nodes is set at $$m' = \left\lfloor \frac{m \times s}{u_{max} \times s_{max}} \right\rfloor.$$

Then, in step S403 of method 400, the scheduling of the sub-tasks is performed, assuming the processing node numbers m' and speeds s' determined in step S402 for each segment $SG_j$. In preferred embodiments of the disclosed technology the scheduling that is performed in step S403 makes use of the GEDF algorithm.

It should be understood that the segmenting and node-scaling approaches are used to calculate the power bound: that is, for each segment we use this approach to calculate the power bound which will be used to decide the optimal CPU speed. The scheduling of the tasks in the segment is performed using the EDF algorithm.

In effect, the method 400 cuts jobs into segments according to their release time and deadline, and the frequencies of processing nodes (cores) for jobs having the same release time are set in a manner which takes into account reduction in energy consumption. According to preferred embodiments of the SEDF technique, in each segment the tasks are scheduled by global EDF, and the frequencies of cores are computed according to the method of Yu et al op. cit. The setting of the processing nodes to the computed operating frequencies may be achieved using commercially-available frequency-adjustment tools (for example, when working on an Nvidia Nano platform, the nvpmodel toolkit may be used to set the computed frequencies).

The above-described scheduling technique is called SEDF here because it employs the GEDF algorithm on a per segment basis.

The segmentation in SEDF is dynamic, and new arriving tasks can be considered immediately and grouped into segments. Therefore, SEDF can be used in both static scheduling and dynamic scheduling for DAG tasks in a real multi-core device.

An implementation of the overall process may be represented by the logical flow set out below, in which the input is a set τ of tasks $\{T_1, T_2, \ldots, T_n\}$, and the number of available processing cores in the target processing device is N. The output from the process is a schedule for execution of the task set by the target processing device.

Logical Flow:

time←0, SE←ø; // SE is a set of tasks and is used to collect all the sub-tasks in the segment while !stop do

```
  if time = Ti's release time then
    SE ←— SE ∪ { Ti };
  end
  if | SE | ≥ N then
    sort tasks of SE in ascending order of tasks' deadline;
  end
  set frequencies according to method described above (from "Node Scaling Analysis for
  Power-Aware Real-Time Tasks Scheduling" by Yu et al op. cit.);
  execute all tasks in SE with global EDF scheduling;
  if Ti completes then
    SE ←— SE − { Ti };
  end
  time ←— time + 1;
End
```

SEDF is based on the estimation of the optimal power consumption theory. The estimation of the optimal power consumption for a real-time DAG task set which can be modelled as an optimization problem is NP-Hard. Inspired by dynamic programming which simplifies a complicated problem by breaking it down into simpler sub-problems in a recursive manner, tasks are aligned into several parallel threads and broken down into small segments according to their release time and deadlines to simplify the problem solving. In each segment, there are independent tasks with the same release time running on a multi-core system, and DVFS can be applied in each segment to optimize the power consumption of tasks.

Results of Simulations

Figure 12:
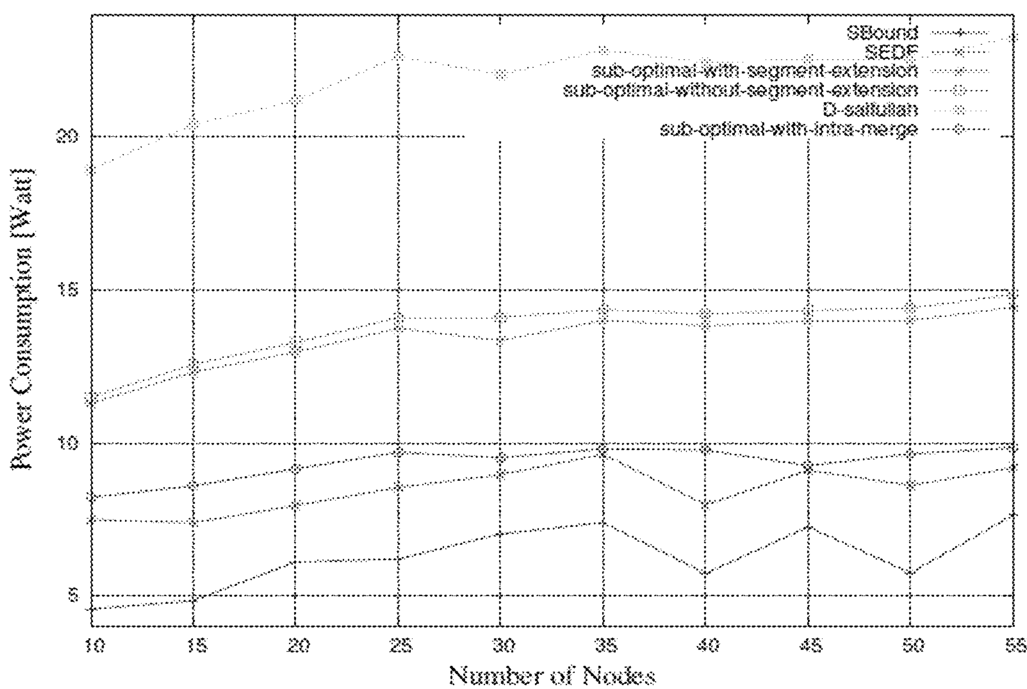
FIG. 12 is a first graph comparing, on the one hand, the power consumption involved in executing periodic DAG tasks that have been scheduled according to various known scheduling algorithms with, on the other hand, the power consumption achieved when scheduling the same tasks using a computer-implemented scheduling method employed in the third embodiment of the disclosed technology, in a case where the period of the tasks is derived from a Gamma distribution.
Figure 13:
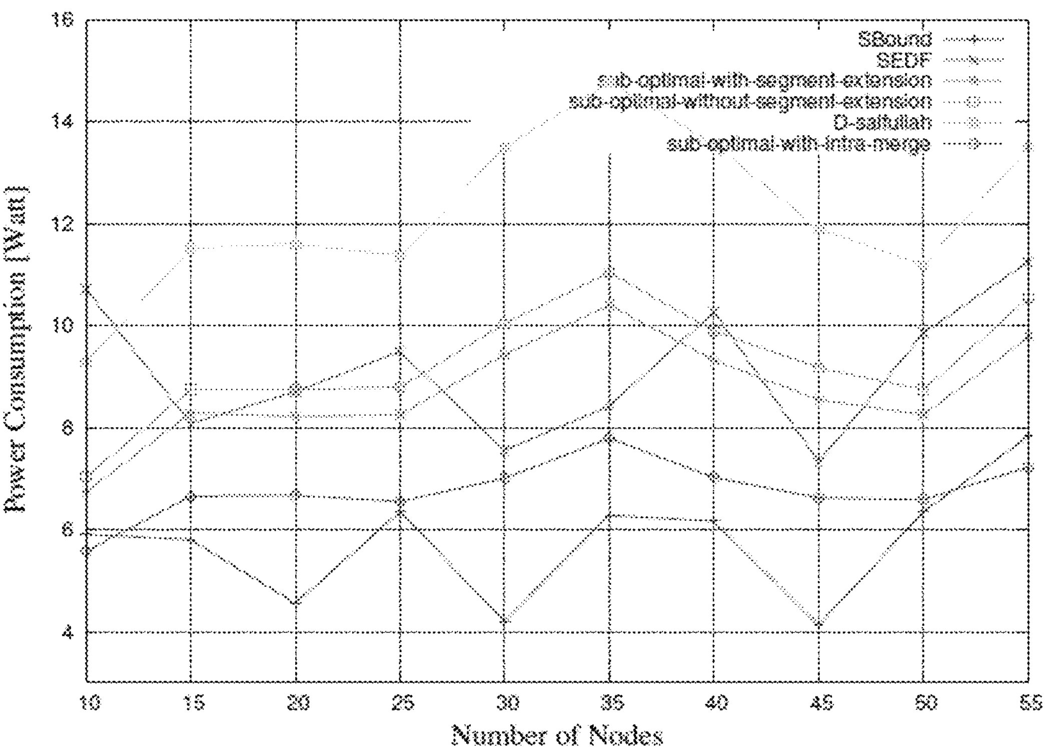
FIG. 13 is a second graph comparing, on the one hand, the power consumption involved in executing periodic DAG tasks that have been scheduled according to various known scheduling algorithms with, on the other hand, the power consumption achieved when scheduling the same tasks using a computer-implemented scheduling method employed in the third embodiment of the disclosed technology, in a case where the period of the tasks is harmonic.

Simulations were performed to compare the power consumption of a multicore processing device executing periodic real-time DAG tasks according to schedules determined using various known scheduling algorithms with the power consumption achieved when scheduling the same tasks on the same device using an embodiment of the SEDF scheduling method according to the disclosed technology. The results of the simulations are illustrated in FIG. 12 and in FIG. 13. FIG. 12 is a first graph that shows results obtained in the case where the modelled tasks had an arbitrary period $P_i$ with this period being modelled according to a Gamma distribution. FIG. 13 is a second graph that shows results obtained in the case where the modelled tasks had a harmonic period, i.e., $P_i=2^{\varepsilon}$.

The algorithms compared in the graphs of FIG. 12 and FIG. 13 are, as follows:

- SBound: this represents the theoretical lower bound on power consumption for executing the target task set.
- SEDF: this represents the power consumption for executing the target task set when the scheduling is performed using an SEDF technique embodying the disclosed technology, assuming the number of processing nodes indicated along the x axis of the graphs.
- D-Saifullah: this is the power consumption for executing the target task set when the scheduling is performed using the scheduling technique described in Saifullah et al op. cit.
- sub-optimal without segment extension: this is the power consumption for executing the target task set when the scheduling is performed using a scheduling algorithm that includes task decomposition, where lengths of segments are determined by a convex optimization proposed in "Energy-Efficient Real-Time Scheduling of DAG Tasks" by Ashikahmed Bhuiyan, Zhishan Guo, Abusayeed Saifullah, Nan Guan, and Haoyi Xiong (in ACM Trans. Embed. Comput. Syst. 17, 5 (2018), 84:1-84:25. https://doi.org/10.1145/3241049).
- sub-optimal with segment extension: this is the power consumption for executing the target task set when the scheduling is performed using a scheduling algorithm that includes task decomposition, where lengths of segments are determined by the convex optimization proposed in Bhuiyan et al op. cit. after performing segment extension.
- sub-optimal with intra merge: this is the power consumption for executing the target task set when the scheduling is performed using a scheduling algorithm which is an extension of the "sub-optimal-with-segment-extension" algorithm with intra-DAG processor merging. This technique assumes an unlimited number of available processing nodes (processor cores).

As can be seen from FIG. 12, in the case where the target periodic real-time DAG task set having an arbitrary period is scheduled using the SEDF method embodying the disclosed technology, the power consumption of the target device is not far from the theoretical lower limit and, indeed, it is the lowest compared to the results achieved using the other tested scheduling algorithms.

As can be seen from FIG. 13, in the case where the target periodic real-time DAG task set having a harmonic period is scheduled using the SEDF method embodying the disclosed technology, the power consumption of the target device is comparable to the power consumption achieved using the approaches described in Bhuiyan et al op. cit. and it is considerably lower than the power consumption achieved using the Saifullah et al approach.

Thus, it can be seen that the proposed scheduling method based on SEDF enables periodic real-time DAG tasks to be scheduled on a single device in a manner which is energy-efficient. However, as indicated above, in a case where the workload of the single device is too great, the scheduling methods according to the first and second embodiments of the disclosed technology can be employed to determine how to offload tasks to one or more other processing devices in an energy-efficient manner.

Figure 14:
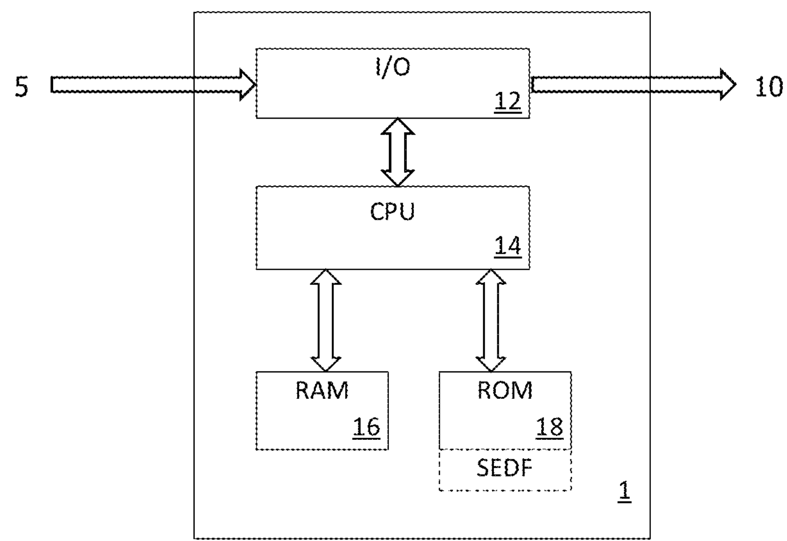
FIG. 14 diagram illustrating an example architecture, employing a general-purpose computing apparatus, that can be used to embody scheduling systems according to the various embodiments of the disclosed technology.

The scheduling methods provided by embodiments of the disclosed technology are conveniently put into practice as computer-implemented methods. Thus, scheduling systems according to the first, second and third embodiments of the disclosed technology may be implemented on a general-purpose computer or device having computing capabilities, by suitable programming of the computer. Thus, scheduling methods according to the first, second and third embodiments of the disclosed technology may each be implemented as illustrated schematically in FIG. 14, using a system comprising a general-purpose computing apparatus 1 having an input/output interface 12, a CPU 14, working memory (e.g. RAM) 16 and long-term storage (e.g. ROM) 18 storing a computer program comprising instructions which, when implemented by the CPU 14 of the computing apparatus, cause the computing apparatus to perform either the scheduling techniques according to the first and second embodiments of the disclosed technology, which implement energy-efficient offloading of tasks, or the combination of scheduling techniques according to the third embodiment of the disclosed technology, which include the use of the SEDF technique to schedule tasks on a single multicore device. Details 5 of periodic tasks to be executed may be received via the input/output interface (or may be generated internally to the computing apparatus 1). The computing apparatus 1 generates the schedule for execution of the tasks and may output the schedule 10 via the input/output interface 12 and/or it may output details of tasks being offloaded to other devices. It is to be understood that in several applications the scheduling systems according to embodiments of the disclosed technology comprise one or a plurality of servers.

Furthermore, embodiments of the disclosed technology provide computer programs containing instructions which, when executed on computing apparatus, cause the apparatus to perform the method steps of one or more of the methods described above.

Embodiments of the disclosed technology further provide non-transitory computer-readable media storing instructions that, when executed by a computer, cause the computer to perform the method steps of one or more of the methods described above.

Variants

Although the disclosed technology has been described above with reference to certain specific embodiments, it will be understood that the disclosed technology is not limited by the particularities of the specific embodiments but, to the contrary, that numerous variations, modifications and developments may be made in the above-described embodiments within the scope of the appended claims.

The invention claimed is:

1. A computer-implemented method of scheduling periodic tasks on a group of multi-core processors, the method comprising:

defining as a combinatorial optimization problem a function of assigning, among a group of M processing devices, a set of tasks T for execution, using an objective function optimizing the power consumption of said processing devices when executing subsets of said tasks T, with a constraint that, for each processing device, a total utilization of a task subset assigned to the respective processing device, when executing on said processing device, is lower than a threshold, said threshold depending on the number of processor cores of said respective processing device;

applying a heuristic algorithm to generate a solution to the defined combinatorial optimization problem; and commanding the scheduling, on each of the processing devices, of the task subset assigned to the respective processing device by the solution generated by the heuristic algorithm.

2. The method of claim 1, wherein each periodic task comprises subtasks and dependencies capable of representation by a directed acyclic graph, and for a group of M processing devices and a set of tasks T for execution, an $i^{th}$ processing device having a number of processor cores equal to $M_i$, an objective function of the combinatorial optimization problem is $$\min\sum_{i=1}^{M} P_i(\tau_i)$$

where $\tau_i$ denotes a subset of tasks, from task set T, which are allocated to the ith processing device, and $P_i(\tau_i)$ represents the power consumption of the ith processing device when executing the task sub-set $\tau_i$;

wherein said constraint is that, in the solution, the relationship $U_{\tau_i} \leq M_i/4$ is respected for all the processing devices scheduled to execute tasks, where $U_{\tau_i}$ is the total utilization of the task sub-set $\tau_i$ when executing on the $i^{th}$ processing device; and wherein said heuristic algorithm is a heuristic MaxMin algorithm or a meta-heuristic Genetic Algorithm to generate a solution to the defined combinatorial optimization problem.

3. The method of claim 2, wherein a heuristic MaxMin algorithm is applied to generate a solution to the defined combinatorial optimization problem, and the application of the heuristic MaxMin algorithm comprises:

setting to zero a sum of tasks' utilization on each processing device j of the group;

determining a maximum value and minimum value of average power consumption for each task $T_i$ on each processing device j in a case where no power-saving measures are employed;

for each task, determining a global maximum and global minimum of the average power consumption across the processing devices in the group;

sorting the tasks of the group in a list of tasks in descending order dependent on a difference between the global maximum and global minimum average power consumption for the respective task;

sorting the processing devices of the group in a list of groups in ascending order of minimum value of average power consumption;

for each processing device in the list of groups, determining whether the sum of (i) the existing utilization of the respective processing device j, and (ii) the utilization of the remaining highest-ranked task $T_h$Th, in the list of tasks, is less than or equal to $M_j/4$; and upon a determination that said sum is less than or equal to $M_j/4$, then assigning task $T_h$ to processing device j, and increasing the value for utilization of device j to said sum.

4. The method of claim 2, wherein a meta-heuristic Genetic Algorithm is applied to generate a solution to the defined combinatorial optimization problem, and the application of the heuristic Genetic Algorithm comprises:

designing a chromosome used by the Genetic Algorithm as a vector, each vector location corresponding to a gene location in the Genetic Algorithm and each gene location corresponding to a task to be assigned to a processing device;

setting the possible gene values to correspond to identifiers of the respective processing devices in the group; and running the Genetic Algorithm with a fitness function $$\min\sum\nolimits_{i=1}^{M} P_i(\tau_i).$$

5. The method of claim 1, wherein on each of the processing devices, the scheduling of the assigned task subset is performed using a global earliest deadline first algorithm.

6. The method of claim 1, wherein, in a preliminary step, a first processing device of the processing devices attempts to schedule the set of tasks for execution on its own processor cores, and upon a determination that the scheduling attempt demonstrates that a resulting workload is too great for the first processing device to execute while respecting timing constraints of the task set that the combinatorial optimization problem is defined and solved to offload tasks to one or more other processing devices in the group.

7. The method of claim 6, wherein in said preliminary step, the first of the processing devices attempts to schedule the set of tasks for execution on its own processor cores according to a process comprising:

decomposing a task into subtasks according to a directed-acyclic-graph representation of the task;

generating a timing diagram assuming an infinite number of processor cores are available to process subtasks in parallel, said timing diagram representing execution of said subtasks on a schedule respecting the deadlines and dependencies of the subtasks defined by the directed-acyclic-graph;

segmenting the timing diagram based on release times and deadlines of the subtasks, each segment including one or more parallel processing threads for execution, respectively, of at least part of a subtask by a respective processor core;

for each segment, dependent on the workload in the segment, deciding the frequency and/or voltage to be used by the processor core or cores to execute the one or more parallel processing threads of the segment, said decision setting the processor-core frequency and/or voltage to reduce power consumption to an extent that still enables respect of the subtask deadlines; and scheduling execution of the subtasks of the segments assuming the processor-core frequencies and/or voltages set in the deciding step.

8. The method of claim 7, wherein in the preliminary step:

the generating of the timing diagram assigns to each segment a first number, m, of processor cores operating at a first speed, s; and the deciding of processor-core frequency and/or speed in respect of a segment changes the number of processor cores assigned to the segment to a second number m' and selects a second speed s' for the second number of processor cores, according to the following process:

determining whether the maximum utilization among the utilizations of the subtasks having portions in the segment is less than or equal to $s_B/s_{max}$, where $s_{max}$ is the maximal speed of the processor cores and $s_B$ is a speed bound defined as $$s_B = \left(\frac{P_s}{2C}\right)^{1/3}$$

where $P_s$ and C are constants in the power consumption function of the processor, determining whether a highest utilization $u_{max}$ is less than or equal to $s_B/s_{max}$, upon a determination that the highest utilization $u_{max}$ is less than or equal to $s_B/s_{max}$, deciding the second speed s' to be equal to $s_B$, and deciding the second number m' of processor cores to be equal to $$\left\lfloor \frac{m \times s}{s_B} \right\rfloor,$$

and upon a determination that the highest utilization $u_{max}$ is greater than value $s_B/s_{max}$, decide the second speed s' to be equal to $u_{max} \times s_{max}$, and decide the second number m' of processor cores to be equal to $$\left\lfloor \frac{m \times s}{u_{max} \times s_{max}} \right\rfloor.$$

9. The method of claim 6, wherein in the preliminary step the scheduling of execution of the subtasks of the segments is performed using a global earliest deadline first algorithm.

10. The method of claim 1, wherein each periodic task comprises subtasks and dependencies capable of representation by a directed acyclic graph.

11. The method of claim 1, wherein said heuristic algorithm is a heuristic MaxMin algorithm or a meta-heuristic Genetic Algorithm to generate a solution to the defined combinatorial optimization problem.

12. The method of claim 1, wherein said constraint is that, in the solution, a relationship $U_{\tau_i} \leq M_i/4$ is respected for all the processing devices scheduled to execute tasks, where $U_{\tau_i}$ is the total utilization of the task sub-set $\tau_i$ when executing on the $i^{th}$ processing device.

13. The method of claim 1, wherein commanding the scheduling, on each of the processing devices, of the task subset assigned to the respective processing device by the solution generated by the heuristic algorithm comprises, for each of at least a subset of the processing devices, offloading tasks to one or more other processing devices in a group of processing devices, wherein processing of at least one of the offloaded tasks cannot begin until at least another of the offloaded tasks has been completed.

14. A scheduling system configured to schedule periodic tasks on a group of multi-core processors, said system comprising a computing apparatus programmed to execute instructions to perform a computer-implemented method of scheduling periodic tasks on a group of multi-core processors, the method comprising:

defining as a combinatorial optimization problem a function of assigning, among a group of M processing devices, a set of tasks T for execution, using an objective function optimizing the power consumption of said processing devices when executing subsets of said tasks T, with a constraint that, for each processing device, a total utilization of a task subset assigned to the respective processing device, when executing on said processing device, is lower than a threshold, said threshold depending on the number of processor cores of said respective processing device;

applying a heuristic algorithm to generate a solution to the defined combinatorial optimization problem; and commanding the scheduling, on each of the processing devices, of the task subset assigned to the respective processing device by the solution generated by the heuristic algorithm.

15. An edge server comprising the scheduling system of claim 14.

16. A non-transitory computer-readable medium having stored thereon a computer program which, when the program is executed by a processing unit of a computing apparatus, cause said processing unit to implement the method of claim 1.

17. A non-transitory computer-readable medium having stored thereon instructions which, when executed by a processor of a computing apparatus, cause the processor to perform the method of claim 1.

* * * * *